United States Patent [19]

Friddle, II et al.

[11] Patent Number: 4,659,042
[45] Date of Patent: Apr. 21, 1987

[54] CANOPY LOCATOR

[76] Inventors: William B. Friddle, II, 8288 Wendstream Way, Edgewood, Md. 21040; Patrick Van Bibber, 514D Alexander Pl., West Point, N.J. 10996

[21] Appl. No.: 622,108

[22] Filed: Jun. 19, 1984

[51] Int. Cl.⁴ ............................................. B64D 17/00
[52] U.S. Cl. ................................ 244/142; 340/384 E; 340/539
[58] Field of Search ............... 244/138 R, 142, 151 A, 244/151 B, 152; 310/317, 322; 340/571, 572, 539, 384 E, 568

[56] References Cited

U.S. PATENT DOCUMENTS

| | | |
|---|---|---|
| 3,090,938 | 5/1963 | Huckabay et al. ................... 310/317 |
| 3,612,448 | 10/1971 | Frieder ............................. 244/138 R |
| 3,697,982 | 10/1972 | Kawaki ............................ 340/384 E |
| 3,872,470 | 3/1975 | Hoerz et al. ........................ 310/317 |
| 3,890,612 | 6/1975 | Sweany et al. .................. 340/384 E |
| 4,101,873 | 7/1978 | Anderson ............................ 340/539 |
| 4,279,433 | 7/1981 | Petaja ................................. 340/571 |
| 4,337,913 | 7/1982 | Booth .............................. 244/151 B |
| 4,507,653 | 3/1985 | Bayer ................................. 340/571 |

Primary Examiner—Galen Barefoot
Attorney, Agent, or Firm—Sheldon H. Parker

[57] ABSTRACT

The invention relates to a homing device having means for providing an audible signal. A piezocrystal is powered by a single battery or a plurality of batteries in series, so as to provide a voltage of at least about 12 volts D.C. whereby the piezocrystal produces at least 80 db during the ON periods. The means to selectively provide electrical connection between the piezocrystal and the power source, is a magnetically activated reed switch held in the open position by the proximity of a magnet. Means is provided to periodically interrupt the flow of current from the power source to the piezocrystal thereby producing a signal ON period of at least two seconds and a signal OFF period of at least two seconds. The homing device can be totally enclosed within a weather proof container with a magnet positioned outside of the container proximate the reed switch. The homing device is secured to the riser of a main canopy riser and the magnet is secured to a ripcord. The break away rip cord cable is attached to a canopy release mechanism which separates the main canopy from a harness. The homing device is contained within a housing which is less than one half inch thick by less than two inches wide by less than three inches long.

14 Claims, 12 Drawing Figures

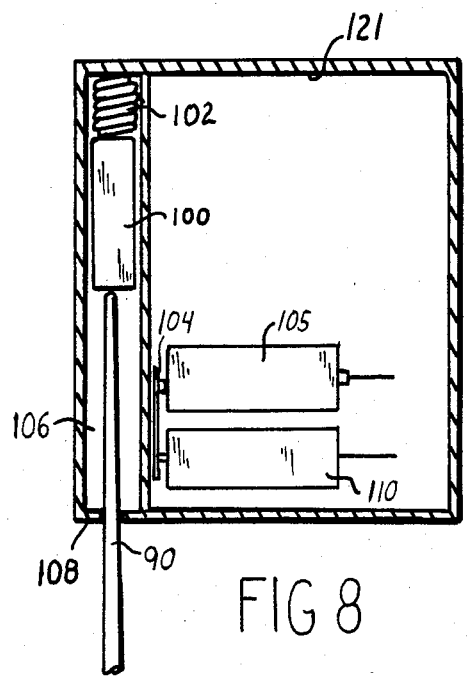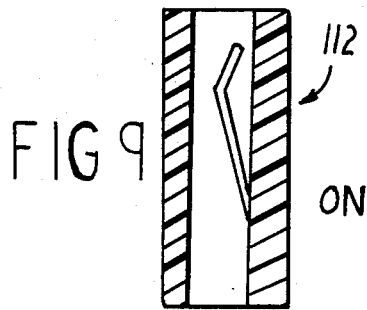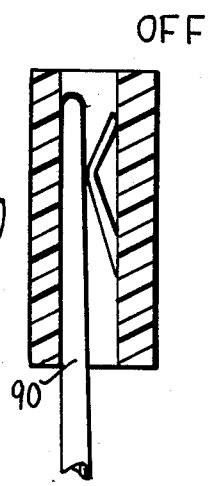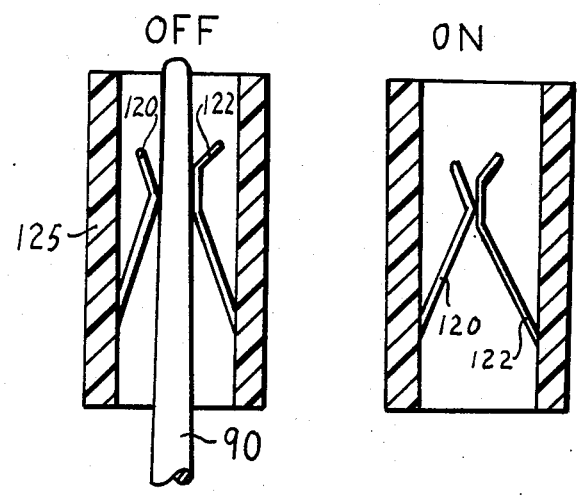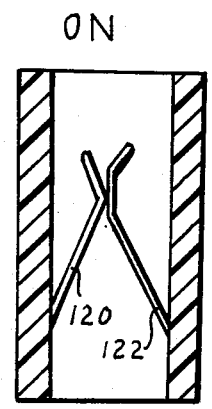

CANOPY LOCATOR

BACKGROUND OF THE INVENTION

1. Technical Field

This application relates to a device for locating a item which has been lost, and more particularly, to a homing signal producing device which produces and audible sound for locating a canopy which has been released during a parachute jump and permitted to float to earth in an undetermined region.

2. Description of the Prior Art

Parachutists wear two parachutes so that in the event of the failure of the main canopy to function properly, a reserve parachute or canopy can be deployed. The main canopy is caused to break away and floats to the ground, most typically landing a substantial distance from the parachutist's target point. Generally, careful observation of the descent of the main canopy can be difficult or impossible. As cost of a canopy can be on the order of up to two thousand dollars, its recovery after a malfunction is highly desirable. It is important to note that in most instances, the malfunction of the canopy does not indicate a defect in the canopy, but rather is related to a problem caused by the way in which the canopy was packed or by some unusual problem encountered as the canopy was opening.

Devices in accordance with the prior art are known for recovering lost items, such as lost keys. Alarms are also known for use in warning of fire, smoke and for use in attracting attention in the event of a mugging, robbery or the like. However, the use of such prior art mechanisms in locating lost parachutes is not satisfactory for a number of reasons.

The use of a device which generates a radio frequency signal could provide one means of achieving the desired result, except that the cost of such unit can be excessive, at least in part due to the need for both a transmitter and a receiving unit. Moreover, it would require the parachutist to carry a receiver and the extra bulk would generally be considered unacceptable to most parachutists.

A severe limitation in the design of a homing device which renders typical alarm systems unsuitable to the needs of parachutists, is the requirement that it be physically attached to the main parachute and must be extremely small so as not to interfere with either the aesthetics of the parachute or its functioning. A device which is large could interfere with the folding of the parachute or be perceived as being a potential hazard and consequently would be commercially unacceptable.

A further problem which can be encountered is that the device must be protected from the environment so that exposure to high humidity or even rain, will not render the device inoperative. An additional requirement is that the device be activated by the releasing of the main chute, but the device must pose absolutely no potential for interfering with the separation of the main parachute from the riser for the reserve canopy.

In attempting to achieve a design which would overcome these problems it is essential to provide reliability and low cost. These apparently incompatible requirements, in combination with the aforenoted problems, apparently have contributed to the absence from the market place of such a device, even though the need for a parachute homing device has persisted for many years.

SUMMARY OF THE INVENTION

It has now been found that the problems encountered with the prior art systems can be overcome through the use of the system of the instant invention which provides among its advantages, extreme ease of manufacture, reliability and low cost, through the use of an unusually low number of simple, small component parts.

The recovery of a lost canopy is achieved by means of a homing device having means for providing an audible signal. The homing device is contained within a housing which is less than one half inch thick by less than two inches wide by less than three inches long. A piezocrystal is powered by a plurality of batteries in series so as to provide a voltage of at least about 12 volts D.C whereby the piezocrystal produces at least 80 db during the ON periods. The means to selectively provide electrical connection between the piezocrystal and the power source is a magnetically activated reed switch held in the open position by the proximity of a magnet. A timing circuit is provided to periodically interrupt the flow of current from the power source to the piezocrystal thereby producing a signal ON period of at least two seconds and a signal OFF period of at least two seconds. The homing device can be totally enclosed within a weather proof container with the magnet positioned outside of the container proximate the reed switch. Alternatively, a spring loaded or biased switch can be used. The homing device is secured to the riser of a main canopy riser and the magnet is secured to a ripcord. The ripcord is attached to the canopy release mechanism which separates the main canopy riser from a reserve canopy harness.

BRIEF DESCRIPTION OF THE DRAWINGS

The objects and advantages of the invention will become more apparent and more readily understood when the following detailed description of the invention is read in conjunction with the drawings wherein:

FIG. 8 is a side view of a preferred embodiment of the instant invention;

FIG. 9 is a side view, partly in cross section, of a mechanical switch;

FIG. 10 is a side view, partly in cross section, of the mechanical switch of FIG. 9;

FIG. 11 is a side view, partly in cross section, of a direct contact switch; and FIG. 12 is a side view, partly in cross section, of the direct contact switch of FIG. 11.

DESCRIPTION OF THE INVENTION INCLUDING THE BEST MODE

Parachutists wear two parachutes so that in the event of the failure of the main canopy to function properly, a reserve chute or canopy can be employed. The main canopy is caused to break away and floats to the ground most typically landing a substantial distance from the parachutists target point. Carefull observance of the descent of the main canopy can be difficult or impossible and, as the cost of a canopy can be on the order of one or two thousand dollars, recovery after a malfunction is highly desirable. It is important to note that in most instances, the malfunction of the canopy does not indicate a defect in the canopy, but rather is related to a problem caused by the way in which the canopy was packed or by some unusual problem encountered as the canopy was opening.

A severe limitation in the design of a homing device is the requirement that it be physically attached to the main chute and that it must be extremely small so as not to interfere with either the aesthetics of the parachute or its functioning. A device which is large and/or heavy could interfere with the packing of the parachute or be perceived as being a potential hazard.

It has now been found that a canopy locator can be provided for attachment to the main canopy riser. In a preferred embodiment the signaling mechanism is a piezocrystal buzzer.

Figure 2:
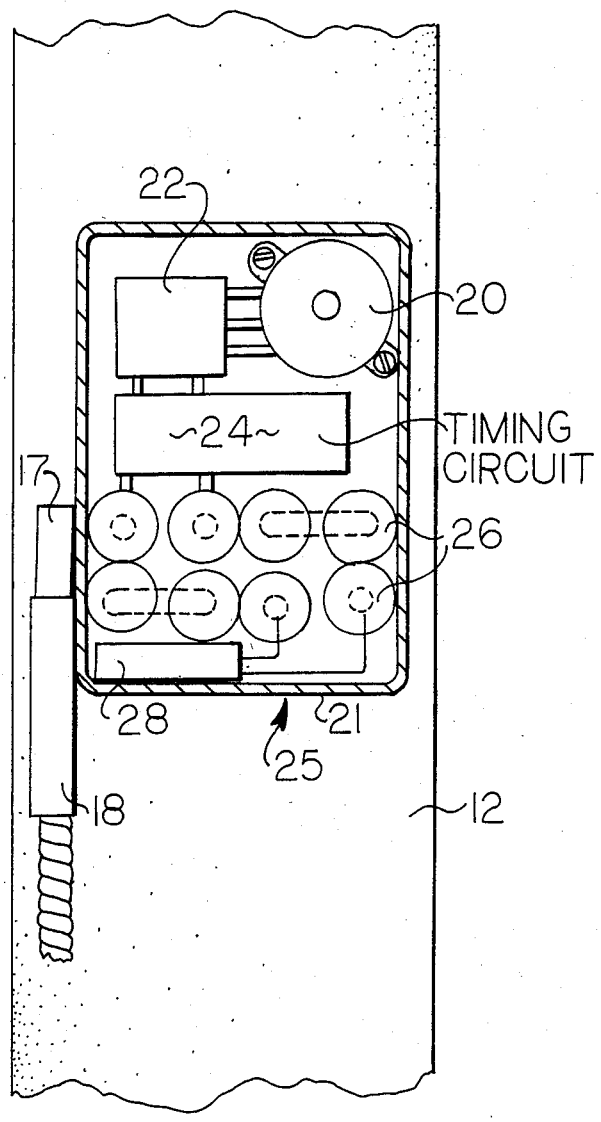
FIG. 2 is a fragmentary top, view partly in cross-section, of the device of FIG. 1.

In FIG. 2, illustrating the preferred embodiment of the instant invention, the mechanism for producing the audible signal is a piezocrystal or buzzer 20. For the piezocrystal device 20 to produce a signal at a decibel level of about 70 to 90 db, it is necessary to apply a voltage of no less than 6 volts and preferably from at least 12 to 15 volts. The greatest problem encountered was obtaining the extremely small dimensions available with the system of the present invention, in combination with the 15 volt requirement. The use of batteries in series provides the required increase voltage but does not maximize the available current. The use of batteries commonly referred to as button cells, and used in hearing aids and watches provides extremely small size, but generally provide a low current capacity.

The parachutist may be several miles from the lost canopy and walking to the area of the canopy can take in excess of one or two hours. Therefore the signal must be generated for a minimum of two hours and preferably at least four hours, and must be sufficiently loud and of a sufficiently high pitch for the sound to carry at least several hundred feet. The piezo device 20 is therefore provided with pulses of power so that the issuing signal is intermittent, thus eliminating current drain on the battery during the off period as well as making the location more distinguishable. A constant signal can become blended into or hidden by background noises. The intermittent nature of the signal enhances the ability of the parachutist to become aware or take notice of the signal. A 12 milliamp drain on a battery that has a 500 milliamp hours of capacity can therefore supply current for more than the required time period of several hours using the intermittent signal.

A 12 volt battery sold by Radio Shack under the designation No. GP 23 and being the tradename Gold Peak Industries, was found to be capable of producing the desired results. The battery has a diameter of less than approximately one half inch and a length of approximately one inch. After two hours of constant driving of the piezocrystal with a non-intermittent circuit, the battery was found to have a voltage of about 9.5 and was being drained at the rate of 5 milliamps. After three and one half hours the battery was found to have a voltage of about 7.5 and was being drained at the rate of 3 milliamps. With the battery drained to the point where it was delivering about 10 volts, the unit was audible at well over one hundred yards. It would be expected that intermittent usage would produce a less severe drain on the battery than constant drain until failure of the battery. In the context of the invention, battery failure would occur when the signal's decibel and pitch levels were insufficient to capable of being heard at a distance of at least several hundred feet.

Figure 1:
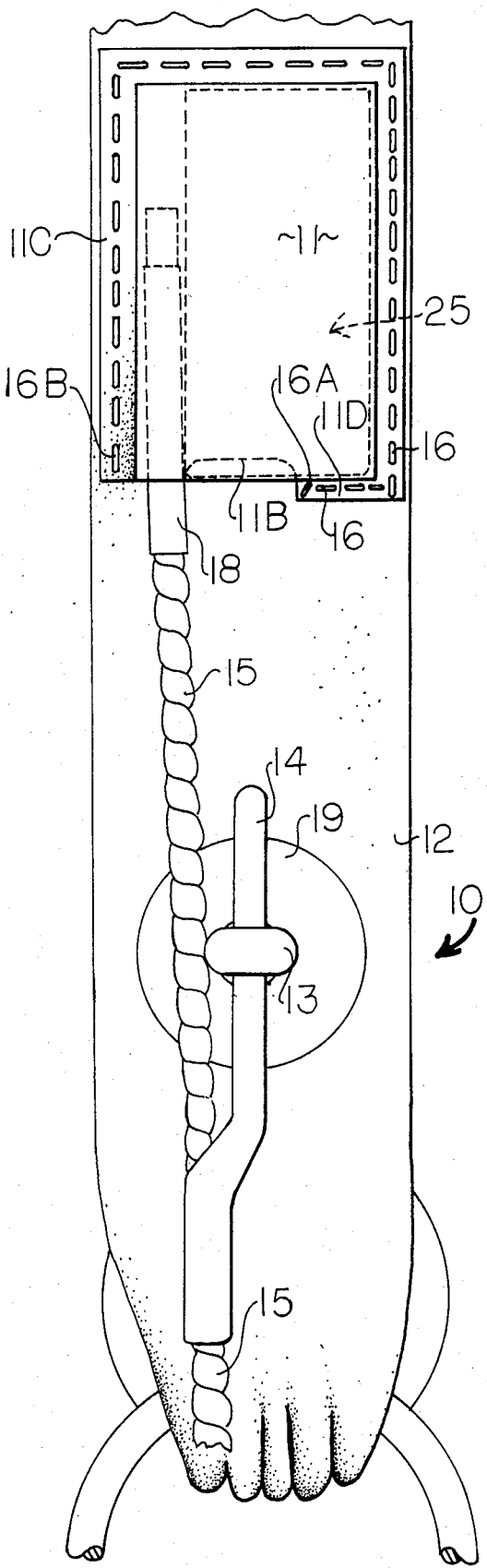
FIG. 1 is a fragmentary top view, partly in cross-section, of a riser portion of a canopy harness, with the device of the present invention attached.

FIG. 1 illustrates the riser portion of a canopy harness, indicated generally as 10. The riser 12 supports the homing device 25. The homing device 25 is supported within a pocket 11 which is secured to the riser 12 in any convenient manner. For example, the pocket 11 can have a plurality of pocket flange 11C, which can be glued or heat sealed to the riser 12. Most conveniently, the pocket flange 11C can be secured to the riser 12 by means of end stitch 16B. For ease of inserting the homing device 25 into the pocket 11 an opening 11E is provided. The size of the opening 11E must be only slightly greater than the end dimension of the homing device 25. The distance between the end stitch 16B and the end stitch 16A thus must be very nearly equal to that of the width of the homing device 25. When the homing device 25 has been inserted into the pocket 11 and forced to one side of the interior of the pocket 11 room is provided for inserting the magnet 17 into the pocket 11.

With the magnet 17 in place, the opening between the end stitch 16A and the end stitch 16B is less than the width of the homing device 25 which is now locked in place. In order to prevent accidental dislodging of the homing device 25 from the pocket 11 a short flange region 11D can be provided. Additionally, an pocket flap 11B can be provided to prevent the homing device 25 from dislodging from the pocket 11.

It should be understood that the illustrated design of the pocket 11, the stitching 16, the pocket flange 11C and the pocket flap 11B represent one operative system, but other securing mechanisms could be employed.

As shown in FIG. 2, the homing device 25 is powered by a plurality of batteries 26 connected in series. The homing device 25 must produce a signal which can be heard for at least 200 feet and preferably for at least 300 feet. In order to cause the piezocrystal 20 to produce at least about 80 decibels and a sufficiently high tone, a plurality of batteries is employed. The use of 10 1.5 volt button cells, such as the Everready battery NO. 386P, in series produces a voltage of the desire 15 volts. The piezocrystal 20 is a solid state device such as sold by Tandy (Radio Shack) under catalogue number 273-064. The Radio Shack piezo buzzer is capable of generating 90 db at 6.5 kHz. The device is about 3/16 by 1 inch and requires 15 milliamps at 15 volts. The device sold by Mallory Inc. under the trademark Sonalert is available in continuous tone, fast pulse and slow pulse versions but are at least 0.58 by 1.68 inches and therefore is thicker than desirable. The Mallory units include those designated as type SBM2, SBM616P and SBM616J and rated at up to 78 db with DC voltage ranges from 1 to 4, 6 to 16 and 4 to 28.

The reed switch 28 can be a switch which is off when in proximity to a magnet. The aforenoted Mallory batteries and proximity magnetic reed switches type RS-24-NO, RS-11-NO and RS-51-NO sold by ALCOSWITCH are listed in the Newark Electronics Equipment catalog 105, available from Newark Electronics, 500 N. Pulaski Road, Chicago Ill. 60624.

The housg 21 can be a sealed rigid container or a shrink film bag with the internal components mounted on a rigid board. A snap open type of container provides the advantage of permitting repeated access to the batteries. The frequency of use of the homing device would be expected to be on the order of once for each several hundred jumps and therefor, the replacement of batteries would be expected to be no more frequent than once every one or two years. This would of course be dependent upon the number of jumps per year and the time length the homing device 25 was permitted to send out its signal before being turned off.

Figure 3:
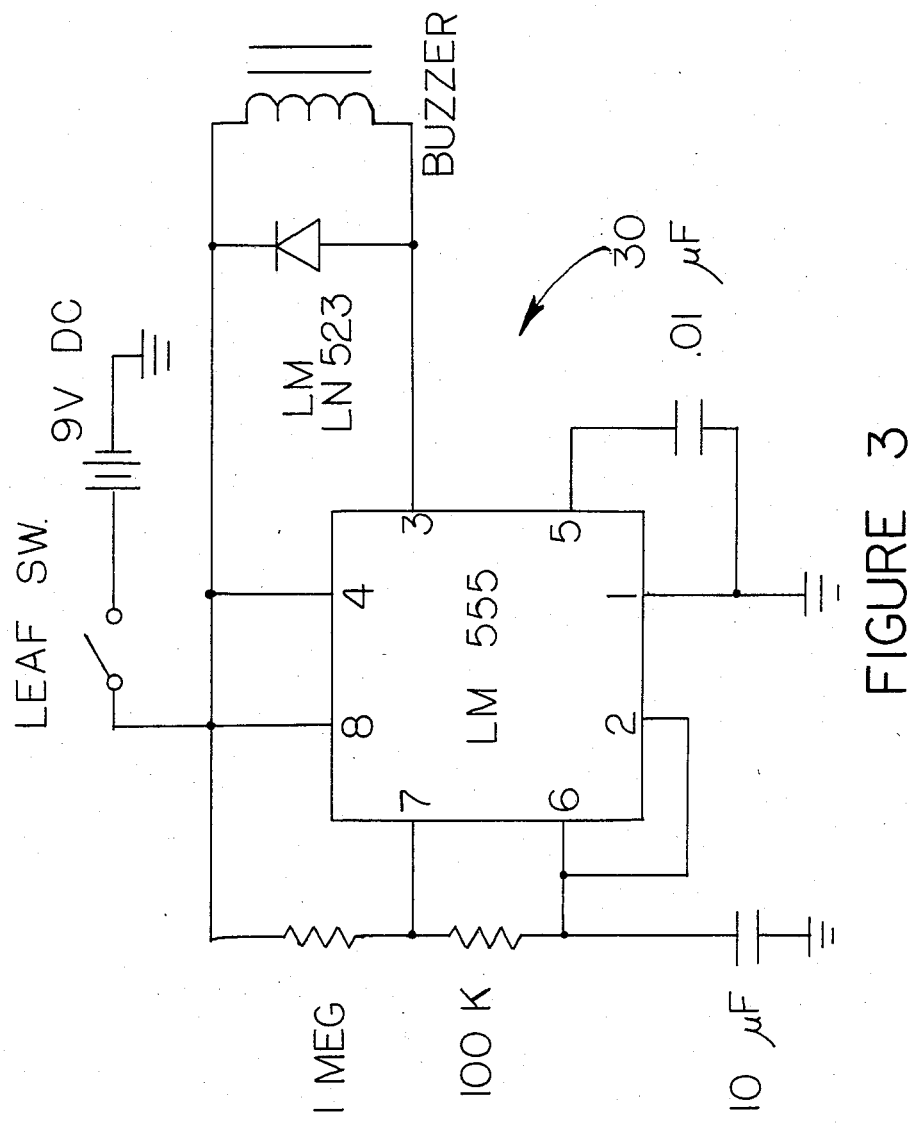
FIG. 3 is a schematic illustration of a timing circuit for the homing device of the present invention.

The intermittent signal can be regulated by any circuit, as well known in the art and illustrated, for example in FIG. 3. The timing circuit 30 would produce an ON period of about 3 seconds and an OFF period of about 10 seconds, with an initial delay of about 20 seconds before the signals begin. The signal ON period must be no less than about two seconds in order to provide sufficient time to discern the direction of the signal. An ON period of at least three seconds has been found to provide an adequate period for most people to determine the direction of the signal. Although the longer the OFF period the greater will be the life of the batteries, too long an OFF period can result in a person walking in the wrong direction for a period of time. An OFF period of no greater that 15 seconds can be used and optimumly, the OFF period is between 6 and 10 seconds. The total absence of an OFF period not only produces maximum consumption of the batteries but also results in a signal which is more difficult to discern at great distances due to the blending in of the signal with background noises.

Figure 4:
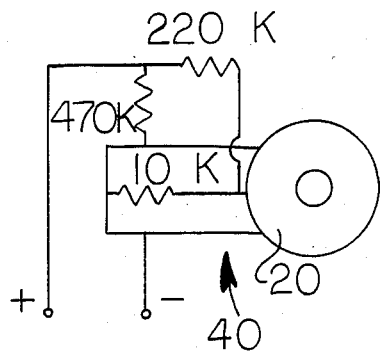
FIG. 4 is a schematic illustration of the circuitry for the piezocrystal of the homing device.

Activation of the reed switch 28 is achieved by moving the magnet 17 from the proximity of the reed switch 28. Since the magnet 17 is not in direct contact with the reed switch 28 the housing 21 can be totally sealed and thus impervious to moisture and dirt. The magnet 17 can be secured to the ripcord 15 by any convenient means such as heat shrunk tube 18. The piezocrystal 20 can be provided, if required, with a piezocrystal power circuit 40 as illustrated in FIG. 4.

Figure 6:
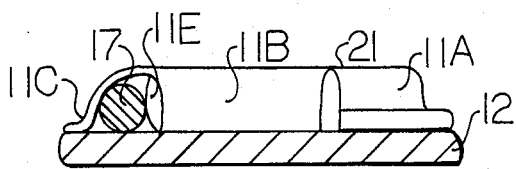
FIG. 6 is an end view of a pocket for securing the homing device to a riser.

As illustrated in the under view of FIG. 6, the homing device 25 is held in place by the pocket flap 11B of the pocket 11 after the magnet is with drawn from its position within the pocket 11. It should be noted that the magnet is loosely held in place within the pocket 11 so as to provide no resistance to the movement of the ripcord 15.

Figure 5:
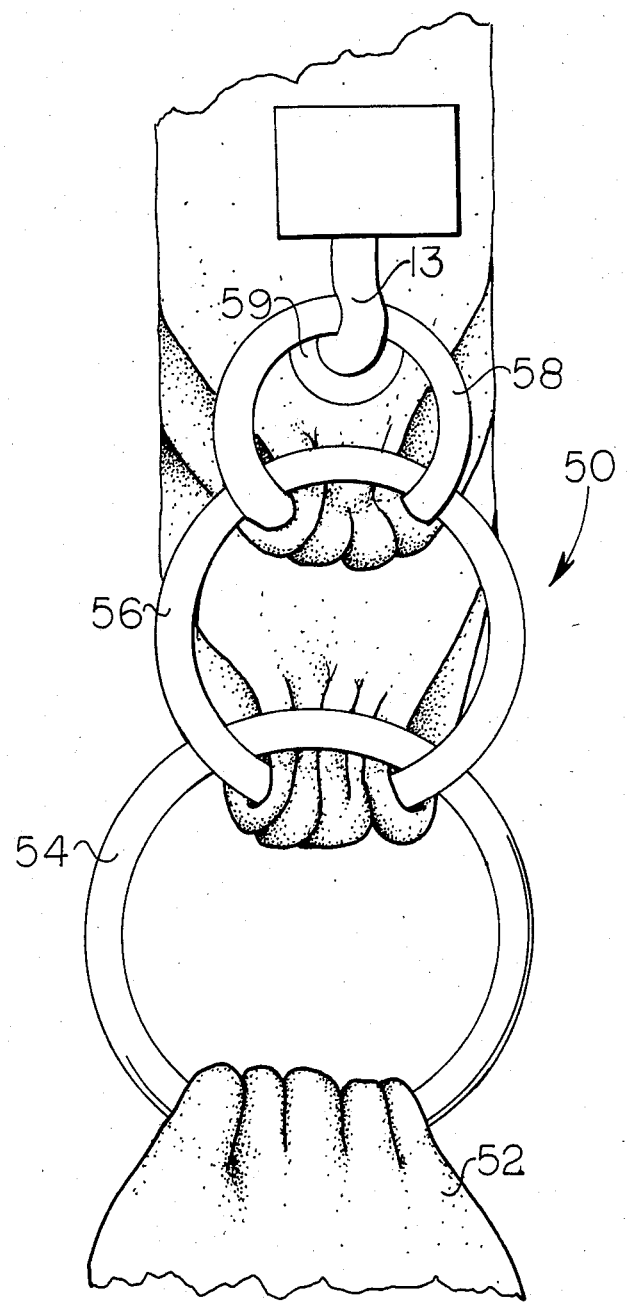
FIG. 5 is a side view of a parachute release mechanism.

The device of the present invention can be used with any desired single point release mechanism and the mechanism illustrated in FIG. 1 and FIG. 5 is merely one well known form of a release mechanism.

As illustrated in FIGS. 1 and 5, pulling the ripcord 15 withdraws the release pin 14 from the release loop 13. Movement of the release pin 14 can be facilitated by the use of a Teflon washer 19 between the grommet 59 and the release loop 13. As evident from FIG. 5, the removal of the release pin 14 from the release loop 13 permits the small ring 58 to move through medium ring 56. As viewed in sequence, the medium ring 56 moves through the large ring 54 and the riser strap 52 is no longer attached to the riser 12 of the quick release riser 10.

The function of the riser rings large ring 54, medium ring 56, and small ring 58 is to provide a ten to one lever or mechanical advantage. When interlocked, the mechanical advantage multiplies to 100 to 1, with the nylon cord loop 13 acting as a two to one pulley, a total mechanical advantage of 200 to 1 per riser is yielded. Therefore, to release a 200 pound jumper from the canopy would require the cable activator to move against a ⅛ pound load from each release loop 13.

Figure 7:
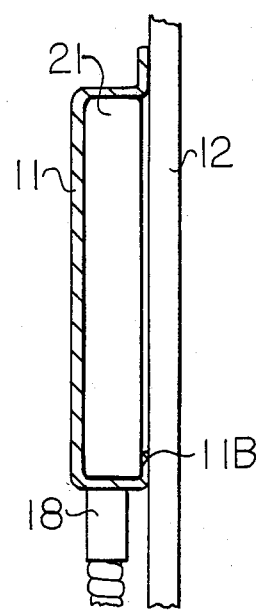
FIG. 7 is a side view, partly in cross-section, of the device of FIG. 6.

With the magnet withdrawn form the pocket 11, as evident from FIG. 7, the portion of the pocket flap 11B folded under the housing 21 precludes accidental dislodging of the housing 21 from the pocket 11.

The typical width "W" of riser 12 is somewhat under 2 inches. Thus, if the magnet 17 and heat shrunk tube 18 have a diameter of about ¼ of an inch, the width of the homing device 25 must be no greater than about 1 to 1.5 inches. Depending upon the number and size of the batteries 26 which are used, they can be in rows of four as illustrated in FIG. 2 or in rows of two or three. The length of the homing device 25 is not as critical as its width or thickness. The thickness must be no greater than about ½ inch and the length can be up to about 2.5 inches.

The homing device activation mechanism can take a variety of forms. In the event the triggering mechanism is a narrow release cable having a diameter, for example, less than about one quarter of an inch, the magnet 17 cannot be carried along with the release cable 90. In such an instance, the magnet can be spring biased so that when the release cable is withdrawn from the magnet containing chamber 106, the spring 102 urges the magnet 17 toward the proximity switch 110. The magnet can be secured to the coiled spring which in turn can be secured to the housing 121. The position of the magnet 17 relative to the proximity switch 110 can be determined by the uncoiled length of the spring 102 and the length of the magnet 17. Alternatively, or additionally, a non-magnetized, magnetizable metal plate 104, can be used to hold the magnet in a desired location. The exit 108 from the magnetic chamber 106 can be restricted so as to preclude accidental loss of the magnet 17.

Alternatively, the position of the proximity switch 110 can be adjacent the magnet 17, with the movement of the release cable 90 producing the separation of the magnet 17 from the proximity switch 110. Obviously, in such a case, the proximity switch 110 is of the type which is held in the "OFF" position by the proximity of the magnet 17.

In another embodiment as illustrated in FIG. 9 and FIG. 10, a switch 110 is held in the "OFF" position by the release cable 90 and moves to the ON position when the cable is withdrawn.

In the embodiment of FIG. 11 and FIG. 12, a pair of contacts 120 and 122 are held out of contact with each other by the release cable and are enabled to close the circuit when the release cable is withdrawn from the position within the direct contact switch 125.

The advantage of the proximity switch embodiments is the ability to provide a total weather tight seal while the "dead man" type switches of FIGS. 8 through 12 provide reliable, low cost systems.

GLOSSARY

| Reference Number | Description |
|---|---|
| 10 | quick release riser |
| 11 | pocket |
| 11A | pocket closure |
| 11B | pocket flap |
| 11C | pocket flange |
| 12 | riser |
| 13 | release loop |
| 14 | release pin |
| 15 | ripcord |
| 16A | end stitch |
| 16B | end stitch |
| 16 | stitching |
| 17 | magnet |
| 18 | heat shrunk tube |
| 19 | Teflon washer |
| 20 | piezocrystal |
| 21 | housing |
| 22 | piezocrystal circuit |
| 24 | timing mechanism |
| 25 | homing device |
| 26 | batteries |
| 28 | reed switch |
| 30 | timing circuit |
| 40 | piezocrystal power circuit |
| 50 | primary parachute release mechanism |
| 52 | riser |
| 54 | large ring |
| 56 | medium ring |
| 58 | small ring |
| 60 | grommet |
| 90 | release cable |
| 100 | magnet |
| 102 | spring |
| 104 | metal plate |
| 105 | battery |
| 106 | magnetic chamber |
| 108 | exit |
| 110 | proximity switch |
| 112 | mechanical switch |
| 120 | contact |
| 122 | contact |
| 125 | direct contact switch |

What is claimed is:

1. In a parachute device, which includes a main canopy and a reverse canopy, the improvement comprising homing device means for providing an audible signal when said main canopy is separated from said parachute device, said homing device comprising in combination,
   means for securing said homing device to said parachute device main riser,
   a piezocrystal,
   a power source for said piezocrystal,
   switch means to selectively provide electrical connection between said piezocrystal and said power source,
   interruption means to periodically interrupt the flow of current from the power source to said piezocrystal thereby producing intermittent, audibly distinguishable, signal ON periods and signal OFF periods,
   activator means, said activator means being placed in proximity to said switch means, wherein the presence of said activator means prevents said switch means from completing said connection and the removal of said activator means allows said switch means to complete said connection,
   canopy release mechanism, said canopy release mechanism including means to cause said main canopy to break away from said parachute device and to cause said activator means to be withdrawn from its position which is in proximity to said switch means.

2. The apparatus of claim 1, wherein said power source is a plurality of batteries in series.

3. The apparatus of claim 1, wherein said power source provides at least 12 volts D.C. and said piezocrystal produces at least 80 db during the ON periods.

4. The apparatus of claim 3, wherein said switch means is a magnetically activated reed switch held in the open position by the proximity of a magnet.

5. The apparatus of claim 4, wherein said homing device is totally enclosed within a weather proof container and a magnet is positioned outside of said container proximate said reed switch.

6. The apparatus of claim 1, wherein said means to periodically interrupt the flow of current from the power source to said piezocrystal produces a signal ON period of at least three seconds and a signal OFF period of at least six seconds.

7. The apparatus of claim 6, wherein said signal OFF period is no greater than about 10 seconds.

8. The apparatus of claim 7, wherein said homing device is contained within a housing which is less than one half inch thick by less than two inches wide by less than three inches long.

9. The apparatus of claim 1, wherein said canopy release mechanism is a break away cable.

10. A parachute canopy having a main canopy and a reserve canopy and having secured to the main riser of said canopy means homing device means for providing an audible signal, comprising in combination,
    a piezocrystal,
    a power source for said piezocrystal,
    switch means to selectively provide electrical connection between said piezocrystal and said power source, said switch means being a magnetically activated reed switch held in the open position by the proximity of a magnet,
    activator means, said activator means includes magnet means proximate said switch means,
    said magnet means preventing said switch means from completing said connection while said magnet is proximate said switch means
    reserve canopy release cable means,
    wherein activation of said reserve canopy release means causes said main canopy to break away and removes said magnet means from its position proximate said switch means and causes said switch means to complete said connection,
    means to periodically interrupt the flow of current from the power source to said piezocrystal thereby producing a substantial signal ON period and a substantial signal OFF period.

11. A parachute having a main canopy and a reserve canopy and having secured to the main riser of said main canopy homing device means for providing an audible signal, comprising in combination,
    a piezocrystal,
    a power source for said piezocrystal,
    signal interruption means, said signal interruption means periodically interrupting the flow of current from the power source to said piezocrystal thereby producing a substantial signal ON period and a substantial signal OFF period,
    switch means to selectively provide electrical connection between said piezocrystal and said power source, said switch means being held in the open position by activator means, activator means, said activator means including reserve canopy release cable means, wherein activation of said reserve canopy release means causes said main canopy to break away and causes said switch means to complete said connection.

12. A parachute including a main canopy and a reserve canopy and having secured to the main riser of said main canopy a homing device having means for providing an audible signal, comprising in combination,
a piezocrystal,
a power source for said piezocrystal,
switch means to selectively provide electrical connection between said piezocrystal and said power source,
activator means, said activator means being placed in proximity to said switch means, wherein the presence of said activator means prevents said switch means from completing said connection and the removal of said activator means allows said switch means to complete said connection,
means to periodically interrupt the flow of current from the power source to said piezocrystal thereby producing a signal ON period of at least about two seconds and a signal OFF period of at least about two seconds,
wherein said switch means is held in the open position by a break away cable portion of a release mechanism which causes said main canopy to break away.

13. The apparatus of claim 12, wherein said means to periodically interrupt the flow of current from the power source to said piezocrystal produces a signal ON period of at least three seconds and a signal OFF period of at least six seconds.

14. The apparatus of claim 13, wherein said signal OFF period is no greater than about 10 seconds.

* * * * *